Nov. 4, 1952    H. SCHMITZ    2,617,010
ELECTRICALLY OPERATED STEAM GENERATOR

Filed Aug. 18, 1951    2 SHEETS—SHEET 1

INVENTOR.
Harry Schmitz,
BY George D. Richards
Attorney

Patented Nov. 4, 1952

2,617,010

UNITED STATES PATENT OFFICE 2,617,010

ELECTRICALLY OPERATED STEAM GENERATOR

Harry Schmitz, Brooklyn, N. Y.

Application August 18, 1951, Serial No. 242,529

4 Claims. (Cl. 219—40)

This invention relates to a steam generator operated by electrically produced heat.

The invention has for an object to provide a steam generator of buoyant characteristics adapted to float upon a body of water serving as a water supply thereto, said buoyant steam generator housing an electrical heating means, and having water admission means through which water from the sustaining water body is constantly admitted, so as to provide a minor segregated quantity of water subject to rapid heating and resultant conversion into steam for discharge from the generator.

The invention has for a further object to provide a steam generator device comprising a buoyant body adapted to float upon a body of water serving as a water supply thereto, said buoyant body having an upwardly open chamber in which is housed an electrical heat generating unit provided by oppositely polarized electrodes separated by nonconductive water absorbent material, said buoyant body having in its bottom a water admission orifice leading into its chamber through which water, from the sustaining water body, is constantly admitted so as to contact and saturate said absorbent material, whereby the absorbed water is heated by flow of electrical energy therethrough from one electrode to the other, and thus converted into steam which discharges from the upper open end of the chamber of the buoyant body.

Another object of this invention is to provide a simple and efficient electrically operated steam generator device, the steam output of which is available for various uses, such as a steam supply for portable heating radiators and other heating devices, as a steam supply for humidifying apparatus, or as a steam supply for any other apparatus to which supplied steam is essential in its operation.

Other objects of this invention, not at this time more particularly enumerated, will be understood from the following detailed description of the invention.

An illustrative embodiment of this invention is shown in the accompanying drawings, in which.

Similar characters of reference are employed in the hereinabove described views, to indicate corresponding parts.

Figure 1:
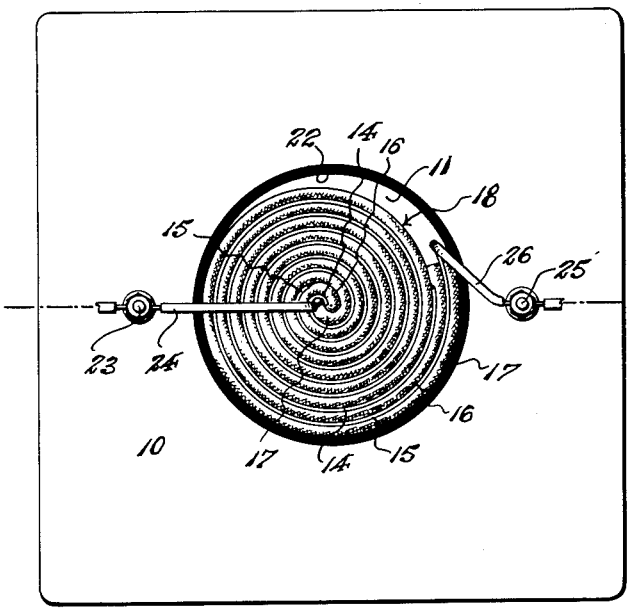
Fig. 1 is a top plan view of a steam generator device according to this invention.

Referring to the drawings, the reference character 10 indicates the body of a steam generator device according to this invention. Said body may be of any suitable shape, and may be either solid or hollow so long as it possesses buoyancy in water, whereby it is adapted to float upon a body of water in such manner that its lower portion is submerged in the sustaining water body, with its upper portion projecting freely above the surface of said sustaining water body. The buoyant body 10 is provided with an upwardly open internal chamber 11 which is closed at its lower end by a bottom wall 12. The bottom wall 12 is provided with an orifice or opening 13 which admits water from the sustaining water body into the interior of the chamber 11.

Arranged within the upwardly open chamber 11 of the buoyant body 10 is an electrical heat generating unit which comprises oppositely polarized electrodes separated by non-conductive absorbent material.

Figure 2:
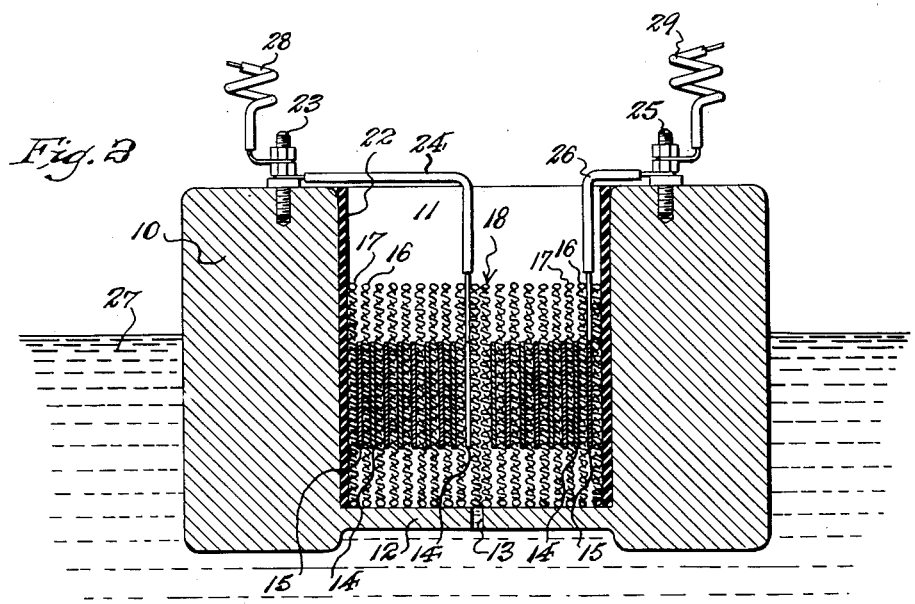
Fig. 2 is a vertical cross-sectional view thereof, taken on line 2—2 in Fig. 1.
Figure 3:
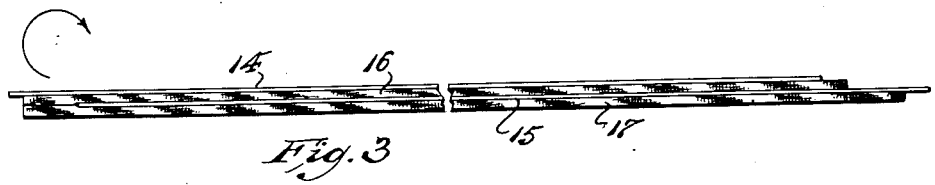
Fig. 3 is a side edge elevational view of one form of electrical heat generating unit for use in the steam generator device of this invention; said unit being shown in its condition before being rolled upon itself into final form.

The electrical heating unit can be variously constructed, but, in one and perhaps a preferred form thereof (see Fig. 3), the same comprises a positive electrode provided by a flexible metallic strip 14 of suitable width, and a negative electrode provided by a like flexible metallic strip 15 of corresponding width. Interposed between the electrode strips 14 and 15 is a flexible band 16 of non-conductive but absorbent material. This band 16 is preferably made of asbestos, either felted or woven, to provide a body adapted to absorb water by capillary attraction, and to such end preferably comprising woven asbestos wicking. Said band is preferably of a width exceeding the widths of electrode strips 14 and 15, whereby to possess substantial water holding capacity. Overlying the outer or exposed face of one or the other of said electrode strips is a similar flexible band 17 of non-conductive but absorbent material, preferably corresponding in kind to the band 16. After the electrode strips 14 and 15 and the associated bands 16 and 17 are assembled in the relation above described, the assembly is rolled endwise upon itself to form a substantially cylindrical heating unit 18 (see Figs. 1 and 2), wherein the electrode strips are disposed in spaced apart parallel helices, with the bands 16 and 17 of absorbent material interposed therebetween.

Figure 4:
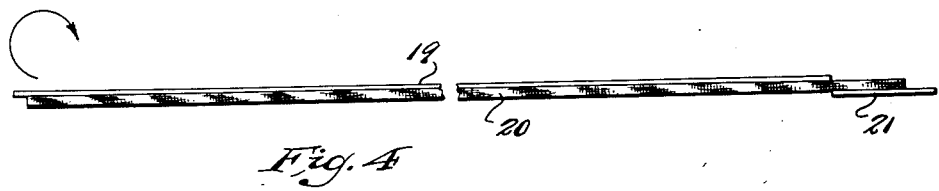
Fig. 4 is a view similar to that of Fig. 3, but showing a modified form of the electrical heat generating unit.

In another form thereof (see Fig. 4), the electrical heating unit may comprise an elongated flexible metallic strip 19 which forms one electrode, said strip 19 being faced with a band 20 of non-conductive but absorbent material. The assembly thus provided is rolled endwise upon itself into a substantially cylindrical formation, and in connection with the external or exposed end portion of the band 20 thereof is arranged the other electrode comprising a short length of metallic strip 21 overlaid thereupon so as to be separated thereby from the electrode strip 19. The resultant formation is adapted to be entered and housed in the chamber 11 of the buoyant body 10.

Other forms and relative arrangements of positive and negative electrodes separated by interposed bands of non-conductive but absorbent material may be utilized, so long as said absorbent material, when saturated with water, serves as a path conductive for flow of current from one electrode to another.

Preferably the side walls of the chamber 11 of the buoyant body are faced with a lining 22 of electrical insulation material.

Means is provided for electrically connecting the heating unit 18, when operatively assembled with the buoyant body 10, in circuit with a source of electrical energy. Such means may be of any suitable kind, and illustratively comprises a positive binding post 23 which is mounted on the top end of the buoyant body 10, being connected to the positive electrode 14 of the heating unit by a lead or conductor 24, and a negative binding post 25 which is also mounted on the top end of the buoyant body 10, and connected to the negative electrode 15 of the heating unit by a lead or conductor 26.

In use, the steam generator device of this invention is deposited upon a body of water 27, which is to serve as a water supply thereto, so as to float thereon. The heating unit 18 of the steam generating device is thereupon connected in circuit with a source of electrical energy by positive and negative circuit wires or conductors which include yieldably extensible portions 28 and 29 respectively connected to the binding posts 23 and 25 of the buoyant body 10. Said yieldably extensible portions 28 and 29 of the service circuit permit unimpeded fall and rise of the floating buoyant body 10 under changes of level of the sustaining water body 27.

When the buoyant body 10 is supported by the sustaining water body 27 with its lower end portion submerged in the water, water rises through the orifice or opening 13 in the bottom wall 12 of the body chamber 11 so as to enter the latter. The water thus admitted to the chamber 11 contacts the absorbent material of the contained electrical heating unit 18, and, by capillary attraction, saturates the absorbent material intermediate the electrodes 14 and 15. Under these conditions, when the electrodes 14 and 15 are connected in circuit with a source of electrical energy, the water content of the intervening absorbent material closes the circuit between the electrodes so that electrical energy flows therethrough from one electrode to the other. Since the volume of water thus interposed between the electrodes is relatively small, and since the resistance of the interposed water is substantially greater than that of the electrodes, sufficient heat is generated to quickly bring the water to a boil, whereby steam is produced. The thus produced steam discharges from the upwardly open end of the chamber 11, and may thereupon be suitably collected and conveyed to a place of use. As the water converted to steam by the above described operation of the steam generator device evacuates the absorbent material of the heating unit, water replacement flows to said absorbent material, through the orifice or opening 13, from the sustaining water body 27, so that steam generation continues without interruption so long as the heating unit 18 remains connected in circuit with the source of electrical energy.

It will be obvious that since the steam generator device operates upon a segregated minimum volume of water contained in the absorbent material of the heating unit, the rapid heating of such small volume of water and its conversion to steam can be very economically electrically effected by relatively small expenditure of electrical energy.

Figure 5:
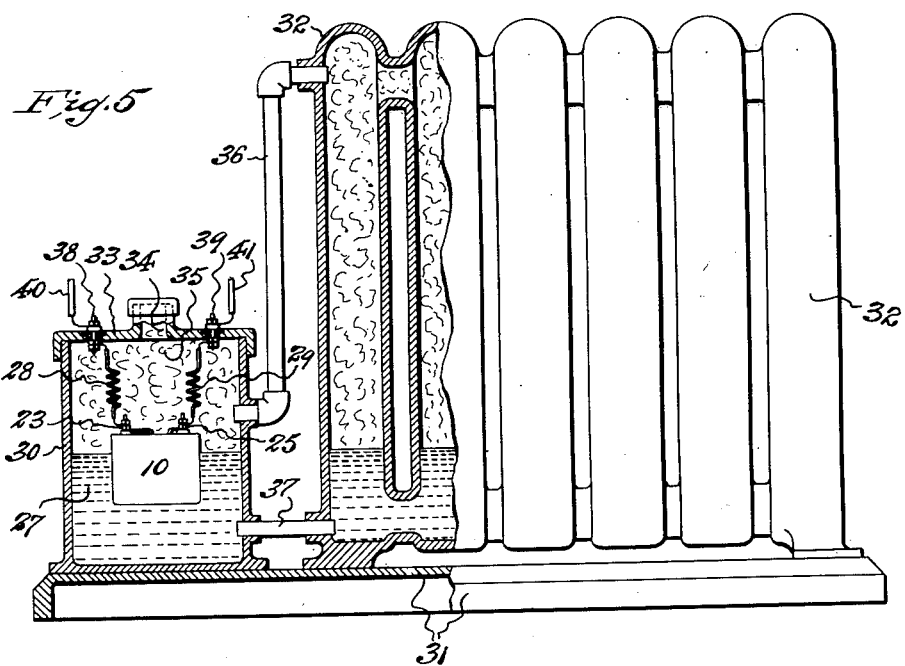
Fig. 5 is a view in part vertical section and in part elevation, showing employment of the steam generator device of this invention as a steam supply for a portable heating radiator, whereby to illustrate one of various uses for which said steam generator device is adapted.

The output of the steam generator of this invention may be put to various uses in connection with which the presence or effect of supplied steam is required. For the purpose of illustration, but not with intention of limitation to such use, the steam generator of this invention is shown in Fig. 5 as applied to a steam heating radiator, which may be of either portable or stationary type, as a source of steam supply thereto. In such connection, a water supply reservoir 30 is mounted upon the base 31 of the radiator adjacent to one end of a radiator or coil 32 which is also supported on said base. The top of the reservoir is closed by a top wall or closure 33, which is preferably provided with a capped filling opening 34. The interior of the reservoir is supplied with a body of water 27 which but partially fills the same, so as to leave steam collecting space 35 within the upper end of the reservoir chamber. A communicating steam delivery pipe 36 is connected between the steam collecting space 35 of the reservoir chamber and the radiator coil 32, and a water return pipe 37 is connected between the bottom of the radiator coil 32 and the water filled lower part of the reservoir chamber. The steam generator of this invention is disposed within the reservoir chamber so as to float upon the water body 27 contained therein, and the electrical heating unit of the generator is connected by the yieldably extensible conductors 28 and 29 to binding posts 38 and 39 which are carried by the top wall or closure 33 of the reservoir 30. To the external ends of the binding posts 38 and 39 are connected the conductors 40 and 41 of an electrical energy supply circuit. When electrical energy is supplied to the heating unit of the steam generator, the generator will function to produce steam in the manner already above described. The steam discharged by the generator will collect in the collecting space 35 of the reservoir chamber, and will be delivered thence by the pipe 36 to the radiator coil 32 to fill the latter. Condensed steam from the radiator coil will be returned through pipe 37 to the water body 27.

Having now described my invention, I claim:

1. A steam generator comprising a buoyant body adapted to float upon a body of water serving as a water supply thereto, said buoyant body having an upwardly open chamber therein the bottom wall of which is provided with a water admission orifice to constantly supply water from the body of water, by which the buoyant body is sustained, into said chamber, and an electrical heat generating unit within said chamber comprising spaced apart oppositely polarized electrodes and electrically non-conductive but absorbent material interposed between said electrodes, said material being adapted to be saturated by water entering said chamber, the water content of said material being subject to heating by flow of electrical energy therethrough from one electrode to the other, and thus to be converted to steam for discharge from the open upper end of said chamber, said electrodes of the electrical heat generating unit each comprising a flexible metallic strip, said strips being arranged in parallel extension and separated by the intermediate electrically non-conductive but absorbent material, the assembly of electrode strips and said material being rolled endwise upon itself into a substantially cylindrical formation, and means to connect said electrodes in circuit with a source of electrical energy.

2. A steam generator comprising a buoyant body adapted to float upon a body of water serving as a water supply thereto, said buoyant body having an upwardly open chamber therein the bottom wall of which is provided with a water admission orifice to constantly supply water from the body of water, by which the buoyant body is sustained, into said chamber, and an electrical heat generating unit within said chamber comprising spaced apart oppositely polarized electrodes and electrically non-conductive but absorbent material interposed between said electrodes, said material being adapted to be saturated by water entering said chamber, the water content of said material being subject to heating by flow of electrical energy therethrough from one electrode to the other, and thus to be converted to steam for discharge from the open upper end of said chamber, said electrodes of the electrical heat generating unit each comprising a flexible metallic strip, said strips being arranged in parallel extension and separated by the intermediate electrically non-conductive but absorbent material, said latter material comprising asbestos wicking adapted to absorb water by capillary attraction, the assembly of electrode strips and said electrically non-conductive but absorbent material being rolled endwise upon itself into a substantially cylindrical formation, and means to connect said electrode in circuit with a source of electrical energy.

3. A steam generator comprising a buoyant body adapted to float upon a body of water serving as a water supply thereto, said buoyant body having an upwardly open chamber therein the bottom wall of which is provided with a water admission orifice to constantly supply water from the body of water, by which the buoyant body is sustained, into said chamber, and an electrical heat generating unit within said chamber comprising spaced apart oppositely polarized electrodes and electrically non-conductive but absorbent material interposed between said electrodes, said material being adapted to be saturated by water entering said chamber, the water content of said material being subject to heating by flow of electrical energy therethrough from one electrode to the other, and thus to be converted to steam for discharge from the open upper end of said chamber, one electrode of the electrical heat generating unit comprising a flexible metallic strip of substantial length, a band of electrically non-conductive but absorbent material overlying said strip, the assembled strip and band being rolled endwise upon itself into a substantially cylindrical formation, and the other electrode of said electrical heating unit comprising a metallic piece disposed to overlie an exposed external face portion of the band of electrically non-conductive but absorbent material.

4. A steam generator comprising a buoyant body adapted to float upon a body of water serving as a water supply thereto, said buoyant body having an upwardly open chamber therein the bottom wall of which is provided with a water admission opening to constantly supply water from the body of water, by which the buoyant body is sustained, into said chamber, an electrical heat generating unit within said chamber comprising spaced apart oppositely polarized electrodes and electrically non-conductive but absorbent material interposed between said electrodes, said material being adapted to be saturated by water entering said chamber, the water content of said material being subject to heating by flow of electrical energy therethrough from one electrode to the other, and thus to be converted to steam for discharge from the open upper end of said chamber, said electrodes of the electrical heat generating unit each comprising a flexible metallic strip of substantial length, said strips being arranged in parallel extension and separated by the intermediate electrically non-conductive but absorbent material, said latter material comprising asbestos wicking adapted to absorb water by capillary attraction, the assembly of electrode strips and said latter material being rolled endwise upon itself into a substantially cylindrical formation receivable in the chamber of the buoyant body, electric terminals mounted on the top end of said buoyant body to which the circuit of a source of electrical energy can be connected, and electrical connections between the respective terminals and respective electrodes of said electrical heat generating unit.

HARRY SCHMITZ.

REFERENCES CITED

The following references are of record in the file of this patent:

UNITED STATES PATENTS

| Number | Name | Date |
|---|---|---|
| 1,154,113 | Hadaway | Sept. 21, 1915 |
| 1,909,973 | Lewis et al. | May 23, 1933 |
| 1,926,987 | Durham et al. | Sept. 12, 1933 |
| 1,977,232 | Ginder | Oct. 16, 1934 |
| 2,111,206 | Coe | Mar. 15, 1938 |
| 2,140,516 | Cowan | Dec. 20, 1938 |
| 2,429,112 | Warren | Oct. 14, 1947 |